UNITED STATES PATENT OFFICE.

JOHN A. EMIG AND JOHN G. KROUT, OF YORK, PENNSYLVANIA.

INSECTICIDE AND FERTILIZER.

SPECIFICATION forming part of Letters Patent No. 704,013, dated July 8, 1902.

Application filed August 3, 1901. Serial No. 70,718. (No specimens.)

*To all whom it may concern:*

Be it known that we, JOHN A. EMIG and JOHN G. KROUT, citizens of the United States, residing at York, in the county of York and State of Pennsylvania, have invented certain new and useful Improvements in Insecticides and Fertilizers, of which the following is a specification.

Our invention relates to an improved insecticide and fertilizer—that is, a liquid that is adapted to be employed to destroy the Hessian wheat-fly and also to assist in the growth of the grain.

The remedy consists of a liquid composed of turpentine, kerosene, and English red, which forms a species of liquid paint. These ingredients are mixed as follows and in such proportions as given below, a gallon of the mixture being employed as a standard: turpentine, three quarts, or about seventy-two and two-thirds per cent.; kerosene, one quart, or about twenty-four and one-fourth per cent., and English red, four ounces, or about three and one-twelfth per cent. These ingredients in about the proportions above set forth are placed in any suitable receptacle and thoroughly mixed.

In using our liquid the same is thoroughly shaken, so as to have the English red and other ingredients thoroughly mixed, and then to every five bushels of wheat one pint of the liquid is used. We have found it much better to place the grain upon a flat place, such as a floor or a very shallow bin, and then thoroughly mix the liquid therewith, so that each grain receives a coating or is slightly soaked therewith, it, however, having been applied to the grain when the same was in the drill; but this method is not as satisfactory as the former, as some of the grains will not receive the proper soaking or coating.

The English red is employed as a coloring and also as an insect-destroyer, as it contains lead in a form which is deadly poison to the Hessian fly and yet does not in any way affect the grain.

It is not known for a certainty whether the Hessian fly habitates the grain as a germ, whether it is in the soil, or whether it attacks the plant as the seed has been sown; but we have found by experience and by giving our remedy a good test that the plant from the seed as above treated is free from the fly and that the same is of a rich green texture and the head of the grain of the largest size and the grain the finest quality. This past harvest we successfully tried our remedy near our homes and found it to be the only remedy which will absolutely prevent the Hessian wheat-fly in the grain, as wheat planted alongside of the wheat upon which our remedy was used was attacked by the fly and great damage was done, whereas the grain upon which our remedy was used was free of the fly and the yield was greatly increased over the other, therefore showing that our remedy besides being a destroyer of the fly was also a fertilizer for the grain.

What we claim, and desire to secure by Letters Patent, is—

A liquid coating for grain, as a remedy for the Hessian wheat-fly, composed of turpentine, kerosene, and English red.

In testimony whereof we affix our signatures in presence of two witnsses.

JOHN A. EMIG.
JOHN G. KROUT.

Witnesses:
T. BLAIR SHOEMAKER,
DAVID P. MOORE.